May 29, 1945.   S. E. McFARLAND   2,377,091
ELECTRICALLY ACTUATED GUN MOUNT
Filed May 6, 1943   6 Sheets-Sheet 1

Fig. 1.

Inventor
Silas Edward McFarland
By Clarence A. O'Brien
and Harvey B. Jacobson
Attorneys May 29, 1945. S. E. McFARLAND 2,377,091
ELECTRICALLY ACTUATED GUN MOUNT
Filed May 6, 1943 6 Sheets-Sheet 3

Fig. 3.

Inventor
Silas Edward McFarland

By Clarence A. O'Brien
and Harvey B. Jacobson
Attorneys

May 29, 1945.  S. E. McFARLAND  2,377,091
ELECTRICALLY ACTUATED GUN MOUNT
Filed May 6, 1943   6 Sheets-Sheet 5

Inventor
Silas Edward McFarland
By Clarence A. O'Brien
and Harvey B. Jacobson
Attorneys May 29, 1945.　　　S. E. McFARLAND　　　2,377,091
ELECTRICALLY ACTUATED GUN MOUNT
Filed May 6, 1943　　　6 Sheets-Sheet 6

Inventor
Silas Edward McFarland

By
Clarence A. O'Brien
and Harvey B. Jacobson
Attorneys

Patented May 29, 1945

2,377,091

UNITED STATES PATENT OFFICE 2,377,091

ELECTRICALLY ACTUATED GUN MOUNT

Silas Edward McFarland, Chicago, Ill.

Application May 6, 1943, Serial No. 485,903

5 Claims. (Cl. 89—37.5)

This invention relates to gun mounts for aircraft and it has for its main or general object to provide a gun mount which permits the gun to perform all the required movements while directed from the pilot's seat.

It is well known that in fighter planes manned by the pilot alone or by a very small crew it has proved to be desirable to have guns, especially machine guns, mounted in or on or below the wings, which are not manned but which are operated from the pilot's seat or from some seat close thereto, so that the essential movements of the gun have to be performed by remote control. The pilot has to be provided with several means for effectively using the guns which are mounted beyond his reach. The guns have to have a fixed position first, and when in this position they are pointed by the airplane itself and are fired when the pilot thinks that the airplane is at the desired position as regards azimuth and elevation. Rapidly firing guns, such as machine guns may moreover be fired while they are rapidly moved to and fro or oscillated and in this case they cover a zone in front of them while the airplane simply moves toward the said zone, finally the gun may be pointed in the usual way directly or by remote control.

The present invention is mainly concerned with the two first-mentioned methods and does not include or describe the usual method of pointing the guns by remote control or otherwise although these methods may be employed in addition to the two methods already mentioned. The invention, therefore, has for its object to provide means for oscillating the guns so as to cover a zone in front of the plane as they fire, thereafter, to return or stop the guns in their predetermined central position and to lock them in this definite position in which they are ready for being fired straight forwardly in substantial parallelism with the longitudinal axis of the plane, the latter as already mentioned being in this case the means for pointing the guns toward the target.

Other objects and advantages of the invention will become apparent to the reader of the following description.

The various mechanisms for effecting these movements of the guns are best described in connection with a modification of the invention shown in the accompanying drawings, in which.

Figure 1:
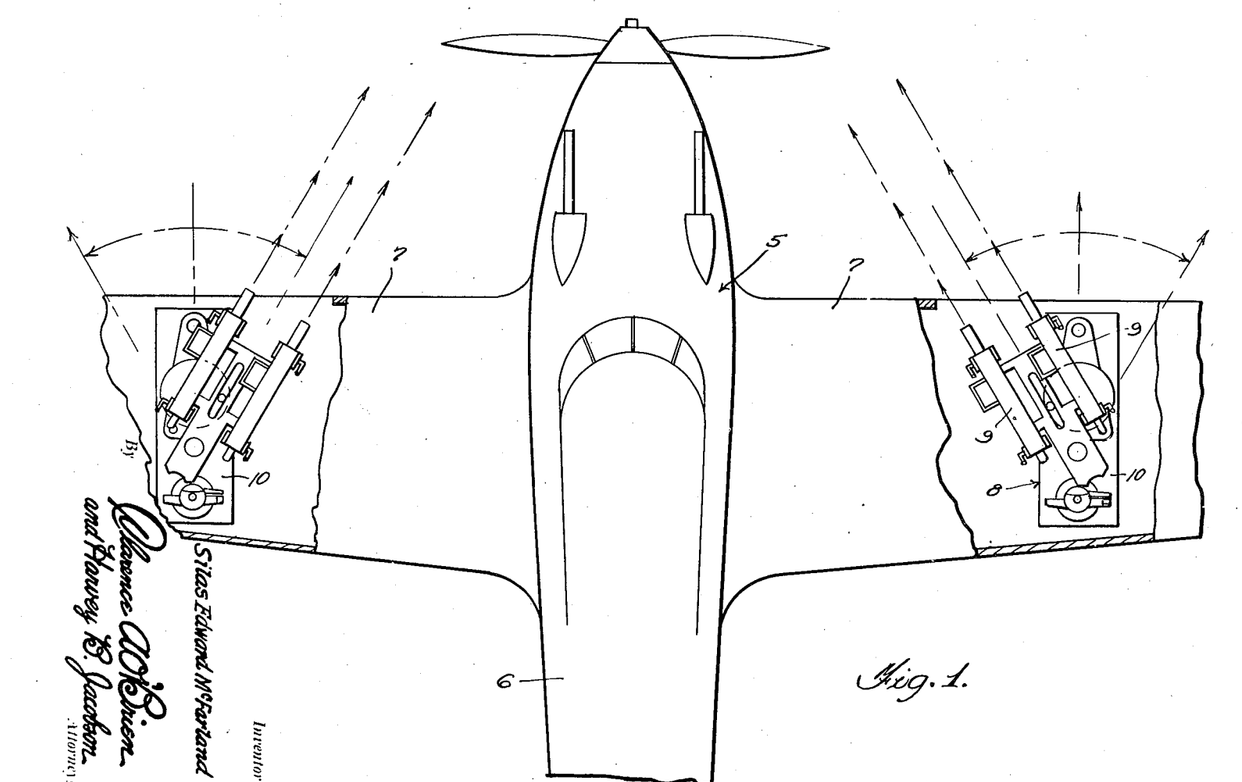
Figure 1 is a fragmentary top plan view of a fighter plane showing one of the improved gun mounts on each of its wings.

Referring to the drawings wherein like numerals designate like parts, it can be seen that numeral 5 generally refers to a conventional aircraft structure including a fuselage 6 and wings 7, 7.

In employing the present gun mount which is generally referred to by numeral 8 and one of which is installed in each wing 7, 7 some slight accommodation for the mount will have to be made in the wing in order that the mount proper will be lower than the top skin of the corresponding wing so as to lessen as much as possible air resistance. It is preferable that each gun mount 8 carry a pair of machine guns 9, 9.

Figure 2:
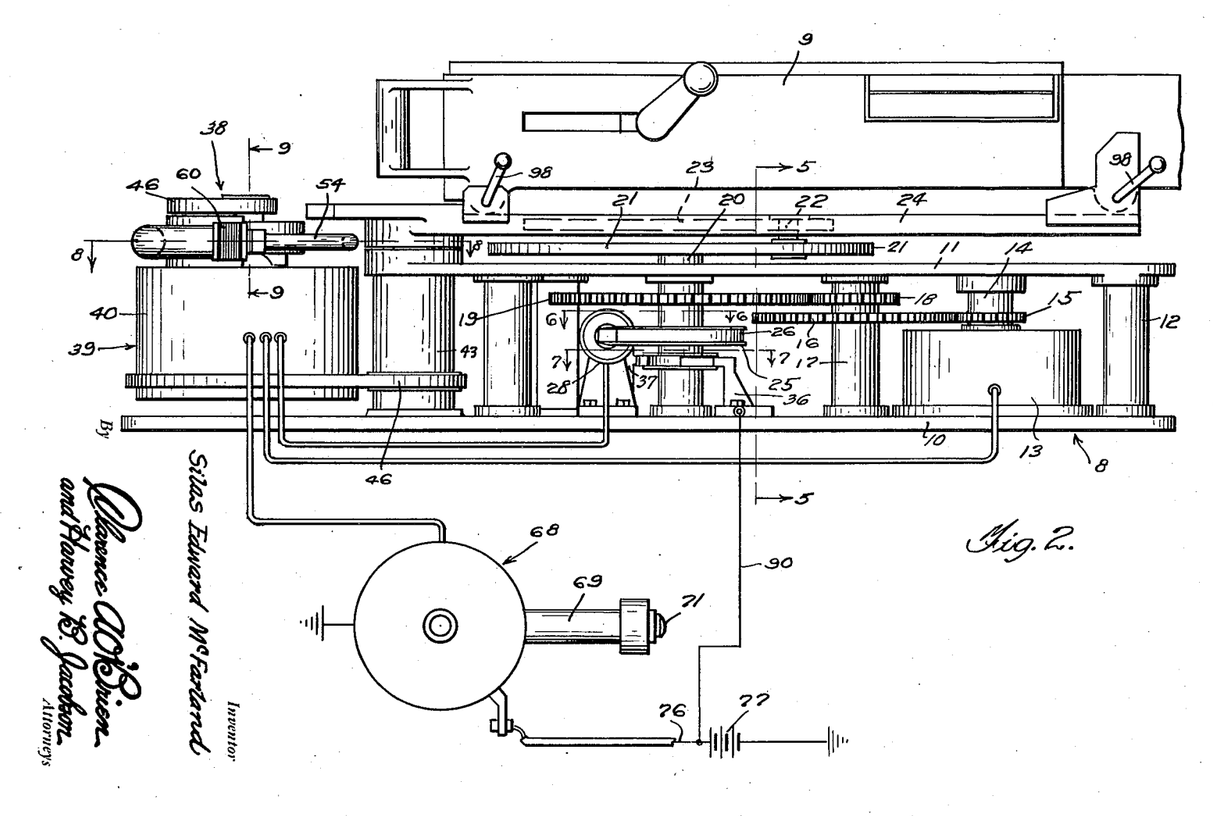
Figure 2 is a fragmentary side elevational view of the gun mount, showing a gun thereon and apart from an aircraft.
Figure 3:
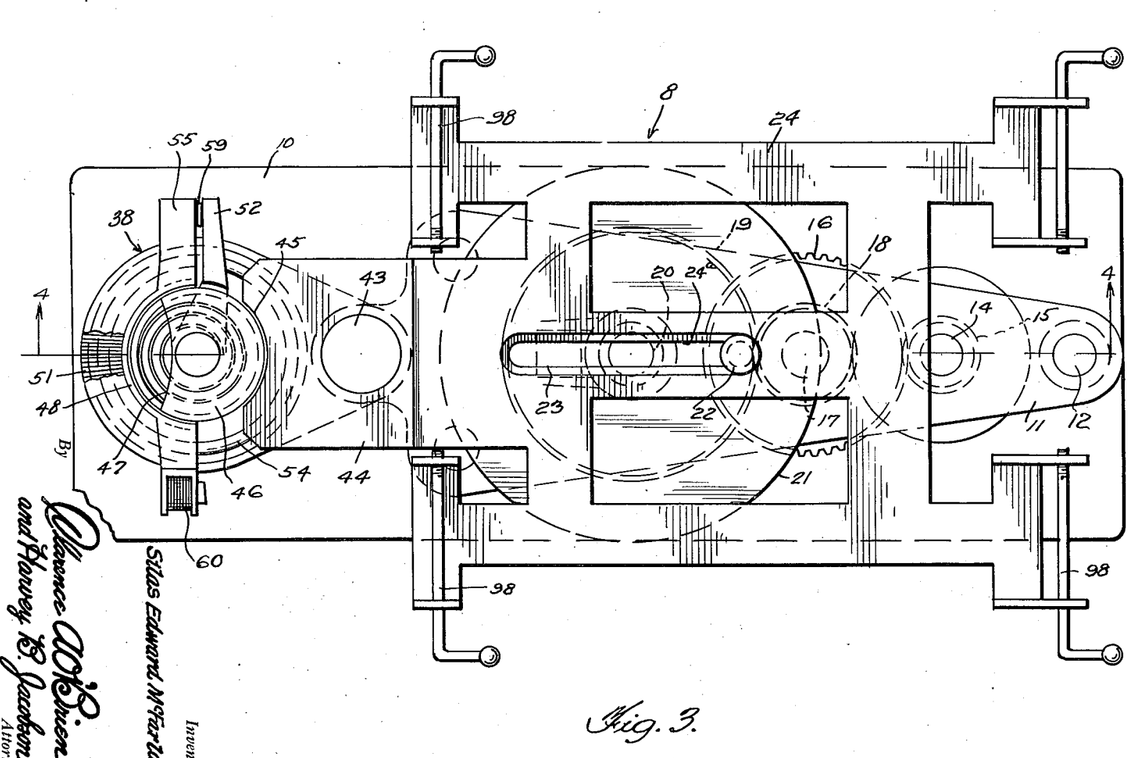
Figure 3 is a top plan view of the gun mount with the gun or guns removed.
Figure 4:
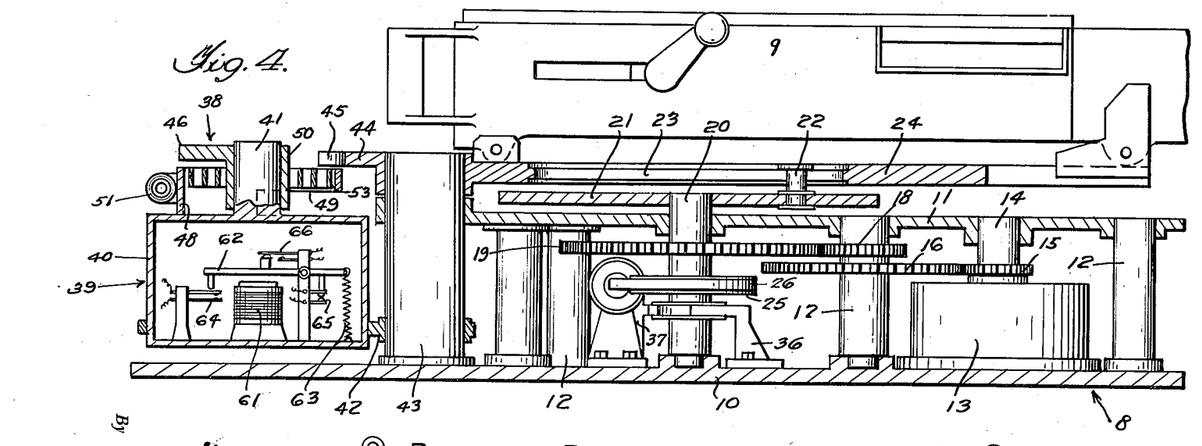
Figure 4 is a longitudinal vertical sectional view taken on the line 4—4 of Figure 3.
Figure 5:
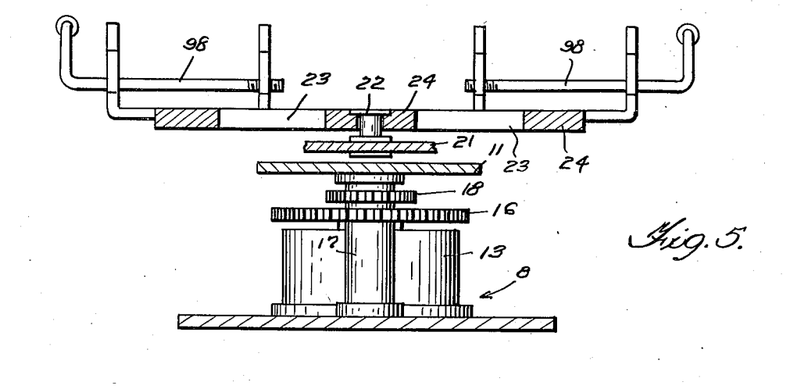
Figure 5 is a transverse vertical sectional view taken substantially on the line 5—5 of Figure 2.

The gun mount 8 includes a base plate 10 spacially above which is held a plate 11 by means of posts 12. On the base and adjacent the forward portion thereof is an electric motor 13 which has an upstanding shaft 14 journaled into the plate 11, this shaft carrying a pinion 15 which meshes with the gear 16 carried by a vertical countershaft 17 interposed between the base 10 and plate 11. (Figures 2, 3 and 4.)

The countershaft 17 has a pinion 18 which meshes with a large gear 19 carried by a vertical shaft 20, the shaft 20 projecting upwardly through a bearing in the plate 11 and having a large disk 21 secured to the upper portion thereof, this disk having an eccentrically located pin 22 projecting upwardly therefrom and through a longitudinal slot 23 in a supporting frame 24 for the guns 9, 9; the latter is rotatably mounted on a post 43 and may swing in a plane which is parallel to the plane of the base 10. It is preferable that the edges of the frame 24 at the slot 23 be formed with a rib to accommodate a flange on the pin 22, and that this pin be equipped with some form of anti-frictional roller. The frame 24 is moreover provided with suitable retaining members 98 at each end thereof which are capable of holding the guns securely in their positions.

Shaft 20 carries a brake drum 25 (Figures 2, 4 and 6) around which is disposed a brake band 26 having end members 27 which are disposed into the field or magnetic influence of an electro-magnet 28, suitably supported by the base 10.

A position controlling unit is situated just under the brake and this comprises a sleeve 29 of insulating material fastened on shaft 20 which carries a sleeve of conductive material denoted by numeral 30. This sleeve is a cylinder about 270° complete, the remaining segment being in the form of an insert 31 of insulation against which a contact 32 normally engages when the gun mount is in straight forward position. A stationary arcuate-shaped current conductor 33 partly straddles the semi-cylinder 30 and has contact members 34, 35 at the ends thereof for wiping engagement with the conductive semi-cylinder 30. The conductor 33 is supported by a suitable bracket 36 and the contact 32 by a suitable bracket 37.

In Figures 2 and 4, numeral 38 denotes a lock mechanism for the mount.

Numeral 39 generally refers to relay control means and this is housed in a box 40 from which rises a stub shaft 41. This box is suitably secured by a clamp ring 42 to a post 43 upon which the gun supporting frame 24 is horizontally swingable.

The locking means for the guns designed to hold them in a definite central position in which they are either parallel to the longitudinal axis of the aircraft or are pointing in a predetermined direction consists mainly in two interlocking parts and in means for moving one of said parts into the locking and unlocking position.

One of these interlocking parts consists of a circular mutilated disk 46 whose periphery has been cut away over a certain angle, the said cut 47 covering a substantial segment. The disk projects from a hub portion 50 seated, but freely rotatable on a stub shaft 41. The hub portion 50 is provided with an arm 52 projecting laterally from the hub. A hole or opening is made in said arm along a line which forms part of a circle whose center is formed by the axis of stub axle 41, said hole serving a purpose which will be explained below.

The disk 46 forming one of the interlocking parts cooperates with a tail portion 44 of frame 24 which is projecting beyond the post 43 around which said frame may be swung and which forms the second interlocking member. The interlocking action between the said two parts is obtained by means of a cut in said tail portion, having the form of a circular segment 45, the center of the circle being the axis of the stub axle 41 on which the mutilated disk is mounted. The uncut periphery of disk 46 fits more or less snugly into the recess 45 and when this uncut periphery of the disk fills the cut 45 it is clear that the tail 44 and the frame 24 cannot be moved.

The cut 47 on the disk 46 and the cut-out segment 45 on the tail portion 44 of the frame 24 cover approximately the same angle when measured around the common center which lies in the axis of the stub axle 41. Therefore, when the two cuts 45 and 47 face each other—but solely in this position of the disk 46—the tail 44 and the frame 24 are free to swing around the axis of post 43, when driven by motor 13.

Figure 6:
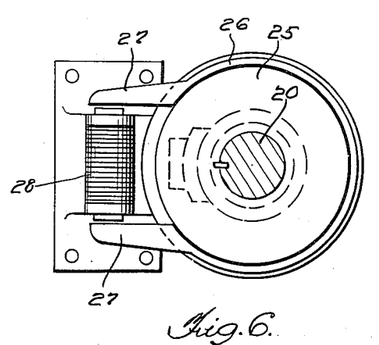
Figure 6 is a horizontal sectional view taken substantially on the line 6—6 of Figure 2.

The means for bringing the two interlocking parts either into the locking or into the unlocking position consists in an electro-magnet 51 of arcuate shape which is fixed on a circular wall 48 surrounding the stub axle 41 at a certain distance and which encircles about half of the periphery of the said wall. This wall is cut along the other half of the periphery at 53 and through this cut the lateral arm 52 of the hub 50 may pass. In the hole 54a of the arm 52 an arcuate core 54 is fixed which may be drawn into the hollow central portion of the electro-magnet 51 and which is of such length that even when the arm 52 is in its position farthest from the electro-magnet as shown in Figure 6, part of said core will be located in said hollow center of the magnet. Upon energization of the electro-magnet 51 the core 54 is drawn into its hollow interior entirely and thus rotates the arm 52, the hub 50 to which it is attached and the disk 46 which is carried by the hub.

Between the wall 48 and the hub a spiral spring 49 is inserted which has the tendency to move the arm 52 into its outermost position in which the core 54 is drawn out of the magnet as far as possible as shown in Figure 6. This spiral spring 49 is, therefore, tensioned when the electro-magnet 51 is energized and moves the arm 52 into the position in which the core 54 is housed entirely in the interior of the electro-magnet 51. The former position corresponds to the locking position in which the frame 24 cannot move. The latter position in which the electro-magnet 51 is energized corresponds to the released or unlocking position in which the two cuts 47 and 49 face each other and the frame may swing forth and back freely.

At one end of the electro-magnet 51 is a small switch box 55 in which is located a pair of contact spring fingers 56, 57 and a contact finger 58. A switch operating member 59 is slidably disposed through wall of the box 54 and is capable of being actuated by the arm 52 under the influence of the spring 49.

Figure 8:
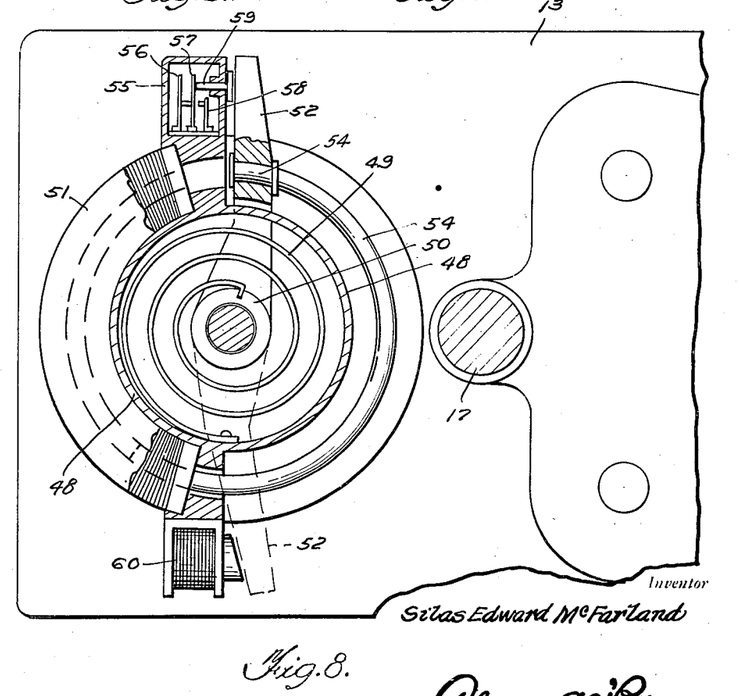
Figure 8 is a horizontal sectional view taken substantially on the line 8—8 of Figure 2.
Figure 9:
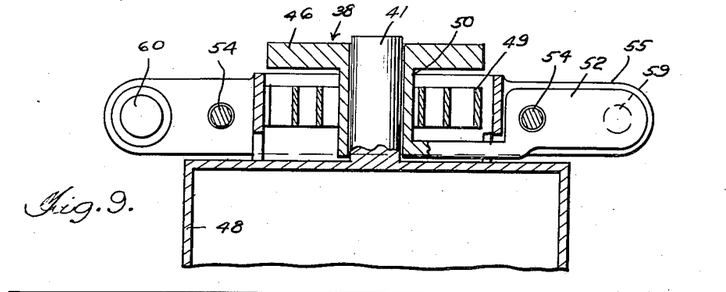
Figure 9 is a vertical sectional view taken substantially on the line 9—9 of Figure 2.

At the opposite end of the electro-magnet 51 is a small holding electro-magnet 60 capable of holding the arm 52 in the broken line position shown in Figure 8 against the action of the spring when the said magnet 60 is energized.

In the switch box 40 is an electro-magnetic relay 61 having an armature 62 held by a spring 63 in a position of rest in which relay contacts 65 are closed while relay contacts 64 and 66 are open, the electromagnetic relay being deenergized in this case.

By means of known retarding mechanisms or simply by properly adjusting the springs of the contacts or the lengths of the operating members the two pairs of relay contacts 66 and 65 do not close and open their circuits simultaneously, but when the relay is deenergized their closing and opening periods overlap. Switch 65 is already closed before switch 66 has been effectively actuated and when switch 66 finally opens at the end of the back stroke of the armature 62 an appreciable period has elapsed during whih both contact switches 65 and 66 hold their respective contacts closed. There is thus an interval during which the circuit controlled by both pairs of contacts is closed.

Figure 10:
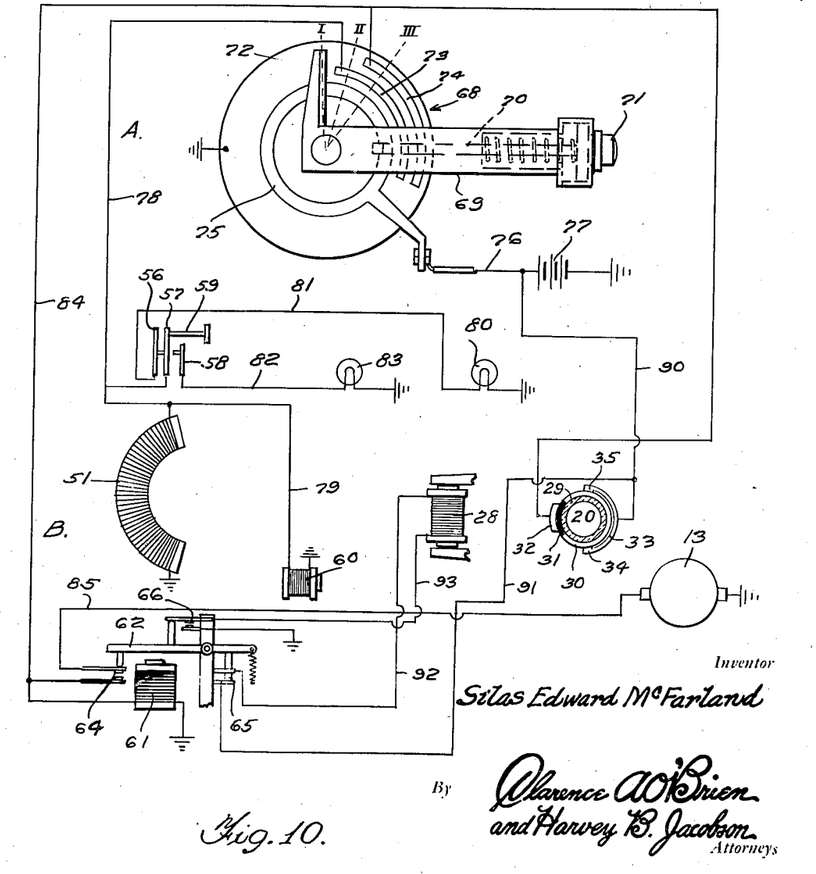
Figure 10 is a diagrammatic view showing the electrical connection between the electrical elements involved.

Numeral 68 in Figures 2 and 10 discloses a manual controller arranged near the pilot's or operator's seat consisting of an arm 69 having a spring-pressed detent 70 operated by a button 71. The arm 69 carries a contactor 72 which is engageable with a contact strip 73 or with both of the contact strip 73 and the contact strip 74. The contactor 72 also rides the current supply ring 75 to which a lead 76 from a battery 77 connects.

The contactor and the arm 69 therefore can occupy three different positions marked I, II and III in Figure 10. In position I, the contactor is not in contact with anyone of the contact rings 73 and 74. In position II, contact is established between the contact ring 75 connected with the battery 77 and contact ring 73 connected with the electro-magnetic arrangement 51 and 60 (circuit A); and in position III, contact is established between contact ring 75 and both contact rings 73 and 74 whereby the circuit of the battery 77 is connected both with the circuit of relay 61 (circuit B) and with the above mentioned electromagnets 51, 60, Figure 10 (circuit A).

In the diagram shown in Figure 10, the connections explain themselves. A battery 77 is provided which is connected with contact ring 75 of the manual controller on one hand and with the position finding mechanism and the brake magnet on the other hand.

The contact ring 73 is connected with the circuit A which contains the electro-magnets 51 and 60 and the contacts 56, 57 and 58 in the circuit of which indicator lamps 80, 83 are inserted to indicate the position of the arm 52 and of the disk 46. The contact ring 74 is connected with the circuit B containing the relay 61.

The operation and the arrangement is the following:

Let it first be assumed that the pilot wants to have the guns in their predetermined position in which they are centrally adjusted with the gun axes in parallel to the longitudinal axis of the plane (or in such other position which may have been selected). The hand lever 69 of the controller is in this case moved into position I. That the guns are now locked in their predetermined central position will be apparent from the fact that in this case none of the two circuits A and B are connected with the tension side of the battery 77. The battery 77 is, therefore, merely connected by lead 90 with the contact member 35 and with relay contacts 65 which are closed when the relay is deenergized. The connection with contact ring 35 has the effect that wherever the guns happen to be when this lever of the manual controller was moved to position I it will be moved to the central predetermined position and will be locked in this position.

Figure 7:
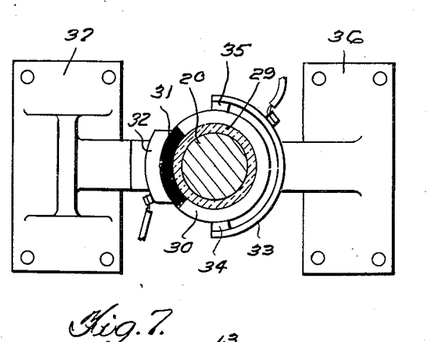
Figure 7 is a horizontal sectional view taken substantially on the line 7—7 of Figure 2.

Assuming, for the sake of explanation, that the gun and the frame 24 have been turned to the right (Figures 3 and 7) and are staying in this position when the hand lever of the controller is moved then the slot 23 of the frame 24 and the pin 22 will also have been turned to the right and will not occupy the required central position which is the longitudinal axis of the arrangement in the example illustrated.

The deviation from the correct central position manifests itself through the relative displacement of contact member 32 with respect to an insulating portion of ring 30. The said contact member now rests on a conducting portion of ring 30 and a circuit is thereby closed from battery 77 over lead 90 to contact piece 35, contact sleeve 30, contact member 32, lead 84, relay 61 and to ground.

Electro-magnetic relay 61 will, therefore, be operated and will close contacts 64 thereby closing a further circuit over lead 85 to motor 13. The motor will start to rotate the gun by means of gear wheels 15, 16, 18, 19 and by means of the shaft 20, the disk 21 and the pin 22. The rotational movement will continue until the contact piece 32 rests on the insulating part of sleeve 30, in which case the circuit will be broken. As the insulating segment faces the contact piece 32 only when the slot 21 and the pin 22 are located in the longitudinal axis of symmetry of the arrangement of the gun, whatever its original position, is brought to the required central position whenever the contact lever 72 is brought into the position I by the pilot.

When the electro-magnetic relay 61 is deenergized the brake magnet 28 is operated. This operation will be described below in connection with the moving of the contactor 72 to position III.

When the hand lever of the controller is moved to the position corresponding to position I of contactor 72 the circuit A is disconnected. Therefore, electro-magnet 51 is deenergized and arm 52 is rotated by spring 49 until it rests on rod 59. Disk 46 which is connected with arm 52 has been rotated to the position shown in Figure 3 where it locks the tail portion 44 of frame 24. It is, therefore, seen that when the contactor 72 is turned to position I the gun is moved to the center position and is locked in this position. Assuming now that the pilot wants to unlock the guns and that he turns the hand lever so as to move the contactor 72 from position I to position II whereby circuit A will be connected with the battery 77. With the contactor in position I the arm 52 or disk 46, as described, was resting on contact 59 under the influence of spring 49 with the core 54 drawn out from the interior of the electro-magnet 51 and the disk 46 locking the tail 44 of the gun carrying frame 24. When the switch arm 72 is now moved to position II, the pilot gets a signal at indicator 80 showing that the circuits are in order. The electro-magnet 51 is energized and when circuit A is connected with the battery and the core 54 (Figure 8) is drawn into the hollow interior of the electro-magnet 51; the arm 52 moves in the direction of a clock against the action of spring 49 until it reaches the stop formed by magnet 60. Magnet 60 is arranged in parallel with electro-magnet 51 and is, therefore, energized at the same time. When arm 52 arrives at the stop it will, therefore, be held against the action of the spring by the combined forces of magnets 51 and 60.

Indicator 80 after having given a short signal is extinguished when the arm 52 begins to move, while indicator 83 now announces the operation of the magnet and the unlocking of the gun.

The movement of arm 52 is transmitted to the hub 50 and to the disk 46 and the latter now assumes the position in which the cuts 47 and 45 are facing each other. Tail 44 is, therefore, free to move in any desired direction.

The gun may now be moved by remote control to any desired position. This structure and arrangement, if provided, is, however, no part of the present invention. Unlocking of the gun is however also necessary as a preliminary step preceding the operation of the guns in which the latter are sweeping over a zone in front of the plane while firing.

To perform this operation, the hand lever of the controller has to be moved by the pilot until contactor lever 72 occupies position III. It will be noted that this position can only be reached by turning the lever through position II, in which the gun is unlocked. The moving of contactor lever 72 to position III connects circuit B containing relay 61 with the battery. The said relay will, therefore, operate and will attract its armature 62 thus closing contacts 64 and 66 and opening contacts 65 as already explained.

The contact 64 closes the circuit of the motor 13 which runs from ground over lead 85 to contact 64 and from there over 84, 72, 75 to battery 77. The motor 13 by means of gears 15, 16, 18, 19 rotates disk 21 and pin 22 and thereby causes a rapid to and fro swinging movement or oscillation of the guns around the pivot 43.

This action continues until the pilot decides to stop it. In this case he moves the lever 72 back to position I. The operation, when contactor 72 has been moved to this position has already been explained and it was mentioned that whatever the position of the gun when the lever is so moved the gun is automatically brought into its middle or central position by the action of the contact members 33, 34, 35, 30 and 32. It has now to be explained how the brake magnet 28 will prevent an overrunning of this position so as to avoid a pendulous movement in which the gun comes only to rest after a while by virtue of friction.

It has been explained that the deenergization of relay 61 occurs practically in three phases: the first phase is that in which the contacts 64 and 66 are closed while the contact 65 is open. This is the first phase that is part of the deenergization. The circuit connection in this phase is that already explained in which the motor circuit is closed while the brake magnet circuit is open at 65. During the second phase the contacts 64 have been opened while the contact 66, due to a retarding appliance or to the arrangement of the arm operating the contactor, is still closed, while contact 65 has already started to close. Therefore, the circuit of the electric motor 13 is deenergized while the circuit of the brake magnet 28 is now closed, the connection being made over lead 90 and 91 and over contact springs 65 already closed, and over lead 92, brake magnet 28, lead 93 and contacts 66 still closed to the ground.

This phase, of course, lasts only for a short time, although it may be stretched by a retarding device to any length which may be necessary. A short energization of the magnet 28 occurs, the brake is applied to the drum and thereby the gun frame 24 is arrested in the proper position. The latter position is forcibly attained for if the gun were not in the proper middle position the relay 61 would not be deenergized. It would still receive current over contact 32 sliding on a conducting part of ring or sleeve 30 and lead 84 connected therewith whatever the position of the lever 72.

The relay 61 can, therefore, be deenergized only when the middle or central position of the gun has been reached and consequently the brake can only be applied in this position which is also the proper position for locking the gun.

Locking occurs as described in connection with the moving of lever 72 to position I.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a gun control system for the remote control of unmanned guns, adapted to be fired either in a predetermined central position or during permanent rapid oscillation covering the zone in front of the gun, a remote control arrangement comprising driving means for rapidly oscillating the guns and a gun frame oscillated by said driving means, means for locking said gun frame in its predetermined central position, mechanical means for bringing said locking means into and for holding said locking means in their operative locking position, electro-magnetic means unlocking the said gun frame so as to permit free oscillating movement of the same, and hand operated remote control means for making the driving means operative and for simultaneously operating the electro-magnet means for unlocking the gun frame locking means.

2. In a gun control system for the remote control of unmanned guns, adapted to be fired either in a predetermined central position or during permanent rapid oscillation covering a zone in front of the gun, a remote control arrangement comprising driving means for rapidly oscillating the guns and a gun frame oscillated by said driving means, means for locking said gun frame in its predetermihed central position, mechanical means for bringing said locking means into and for holding said locking means in their operative locking position, electro-magnetic means for unlocking the said gun frame so as to permit free oscillating movement of the same, position controlling means associated with the gun frame, electro-magnetic means operated by remote control for making said driving means operative, said position controlling means operating in parallel to the aforesaid electro-magnetic means to make said driving means operative for determining the correct position.

3. In a gun control system for the remote control of unmanned guns, adapted to be fired either in a predetermined central position or during permanent rapid oscillation covering a zone in front of the gun, a remote control arrangement comprising driving means for rapidly oscillating the guns and a gun frame oscillated by said driving means, position controlling means associated with said gun frame, means for locking said gun frame in its predetermined central position and means for bringing said locking means into operative locking position when the position controlling means have brought the gun frame into the predetermined central position, while holding said locking means out of engagement with the gun frame when the driving means oscillating the gun frame are switched in by the hand operated remote control circuit.

4. In a gun control system for the remote control of unmanned guns, adapted to be fired either in a predetermined central position or during permanent rapid oscillation covering a zone in front of the gun, a remote control arrangement comprising driving means for rapidly oscillating the guns and a gun frame oscillated by said driving means, means for locking said gun frame in its predetermined central position, said means comprising a projection on said gun frame provided with a cut, a locking disk entering said cut and provided itself with a cut of a length corresponding to that of the locking projection, mechanical means for holding said disk in its locking position, electro-magnetic means for rotating the disk into the position in which the two cuts are facing each other, and a hand operated remote controller for energizing said electro-magnetic means concurrently with the driving means oscillating said gun frame.

5. In a remote control system for guns as specified in claim 2, position controlling means consisting of a sleeve having an insulating peripheral segment inserted into an otherwise conducting surface, said sleeve being mounted on the shelf oscillating the gun frame, means for supplying the conducting surface with current, a sliding contact on said sleeve, the current through said position finding device being interrupted when the sliding contact faces the insulating portion, the latter being arranged on said sleeve in accordance with the position to be occupied by the shaft.

SILAS EDWARD McFARLAND.